Sept. 6, 1960   R. J. PIERSON   2,951,460
POWER STEERING ATTACHMENTS FOR OUTBOARD MOTORS
Filed Oct. 13, 1959   2 Sheets-Sheet 1

REED J. PIERSON
INVENTOR.

BY *Walter G. Finch,*
ATTORNEY

Sept. 6, 1960          R. J. PIERSON          2,951,460

POWER STEERING ATTACHMENTS FOR OUTBOARD MOTORS

Filed Oct. 13, 1959                                  2 Sheets-Sheet 2

REED J. PIERSON
    INVENTOR.

BY *Walter G. Finch*
        ATTORNEY

2,951,460

POWER STEERING ATTACHMENTS FOR OUTBOARD MOTORS

Reed J. Pierson, 7020 Dunhill Road, Baltimore, Md.

Filed Oct. 13, 1959, Ser. No. 846,203

6 Claims. (Cl. 114—144)

This invention relates generally to steering apparatus for water craft, and, more particularly, it pertains to a power steering attachment for outboard motors.

The customary hand tiller steering of an outboard motor becomes unsatisfactory when the latter is attached to boats with large vision-obstructing fore structure. It is equally frustrating for an operator to be required to tend a stern tiller in a one-man operation of small boats when the presence of the operator is required in the bow.

There has arisen a demand for an easily mounted steering accessory to existing outboard motors which has a minimum of external hardware. It is desired that the steering device be controlled by the operator from any position on the craft in a reliable and safe manner.

It is, therefore, an object of this invention to provide a single-packaged remote-controlled steering unit for outboard motors.

Another object of this invention is to provide an inexpensive, simple, and easy to manufacture electric steering motor arrangement which cannot be over-controlled.

Still another object of this invention is to provide a remotely operated steering arrangement for outboard motors which can be quickly discounted from a boat.

There are other objects and attendant advantages of this invention which will become more readily apparent and understood from the following detailed specification and accompanying drawings in which.

Figure 1:
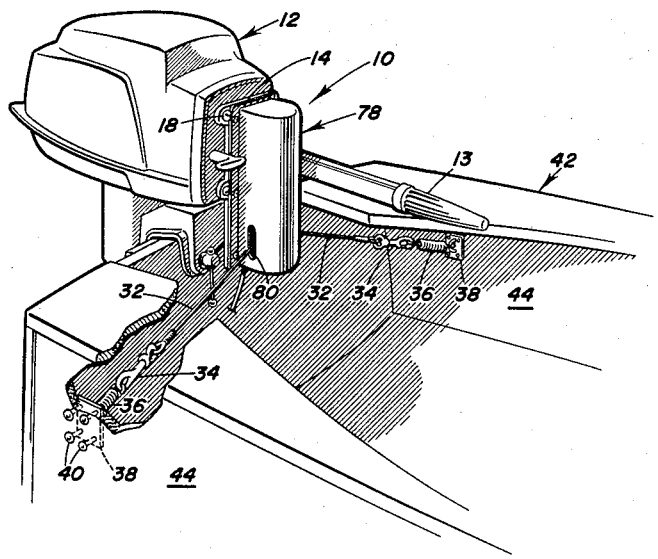
Fig. 1 is a perspective view of the novel steering device incorporating features of this invention, showing its attachment to an outboard motor and a boat.

Referring now to the details of the drawings, there is shown generally in Fig. 1 a conventional outboard motor 12 used for propelling a boat 42, such as an outboard motor boat. In the usual manner, the outboard motor 12 is clamped to the stern of the boat 42. The boat 42 is then locally steered by pivoting the motor 12 in its mount by means of a conventional tiller 13.

A novel steering device 10, which is the subject matter of this invention, is provided for remotely steering the boat 42. This stering device 10 is shown in Fig. 1 secured to the outboard motor 12 by means of bolts 18. In this position, forward of the pivot of the outboard motor 12, the steering device 10 swings with the tiller 13 from side to side as the boat 42 is directed.

Figure 2:
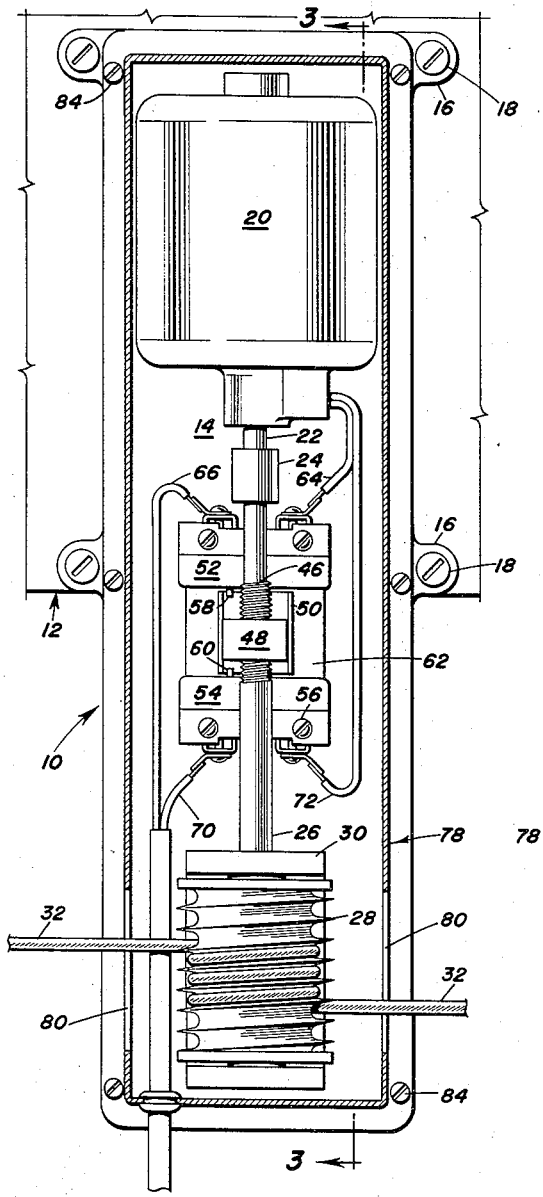
Fig. 2 is a front elevation, partly in cross-section, of a portion of the steering device of Fig. 1.
Figure 3:
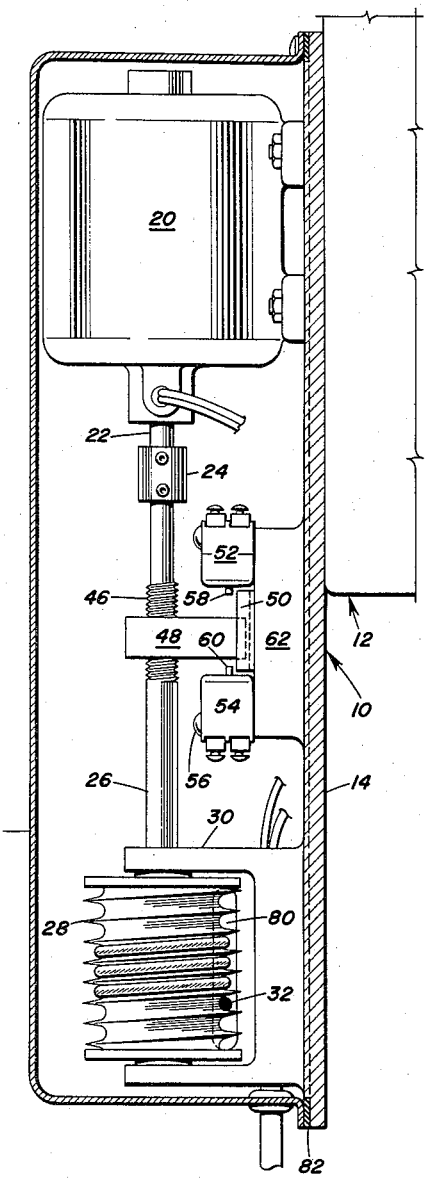
Fig. 3 is a side elevation, partly in cross-section, of the steering device shown in Fig. 2.

As illustrated in Figs. 2 and 3, the steering device 10 is constructed on a base plate 14 which is provided with a plurality of mounting legs 16. A reversible electric motor 20 having a motor shaft 22 is mounted on the upper portion of the base plate 14. The motor shaft 22 is connected to a drum shaft 26 by means of a coupling 24. At the lower end of the base plate 14, there is provided a drum bearing boss 30 which mounts a grooved drum 28 on the drum shaft 26.

A switch mounting boss 62 is provided intermediate the motor 20 and drum bearing boss 30. An elongated groove or guide channel 50 is milled into this boss 62 to capture a traveling switch actuating block 48 and yet provide vertical freedom therefor. The block 48 is threaded to receive screw threads 46 on the ends of shaft 26.

When the shaft 26 rotates, the block 48 cannot turn and it is caused to be raised or lowered between the actuators 58 and 60 of a pair of normally closed microswitches 52 and 54, which are secured to the boss 62 by means of screws 56.

Several passes of a cable 32 are made around the drum 28, and the ends thereof are passed through opposing slots 80 provided in a cover 78. The cover 78 is provided to ward off water spray. It is secured to the base plate 14 by cover mounting screws 84. A gasket 82 is provided between the cover 78 and the base 14, as shown best in Fig. 3.

Referring now to Fig. 1, the ends of the cable 32 are each equipped with swiveled snap hooks 34. When remote steering of the boat 42 is to be done, these snap hooks 34 are each attached to cable tension springs 36. The other ends of the springs 36 are secured to eye fittings 38, which, in turn, are attached by bolts or rivets 40 to opposite inner sides of the gunwales 44.

Figure 4:
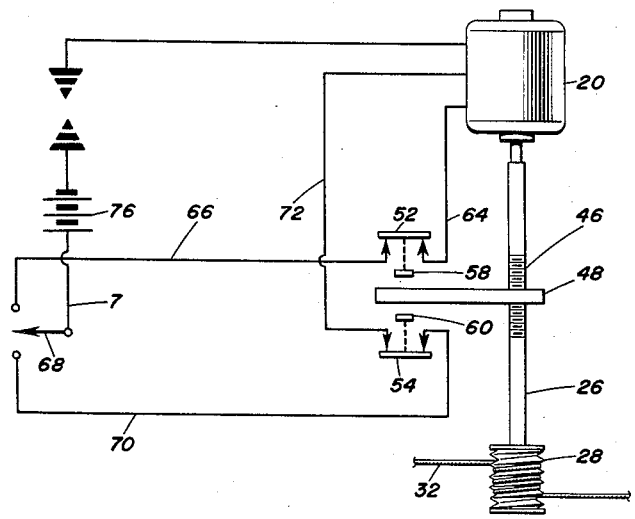
Fig. 4 is a schematic diagram of a control circuit for the steering motor.

The motor 20 and a battery 76 are arranged to have a common ground connection which is designated by the schematic ground symbols shown in Fig. 4. A forward rotation lead or connection 64 and a reverse rotation lead or connection 72 are provided from motor 20 and they are connected to microswitches 52 and 54. The microswitches 52 and 54 are then connected by leads 66 and 70 to the stationary contacts of a center-off, three-way switch 68. The mounting contact of switch 68 is attached to the ungrounded side of the battery 76 by means of a lead 7.

In actual operation of the steering device 10, by throwing switch 68 to one side or the other, electrical circuitry is established from the battery 76 to the forward or reverse leads 64 or 72, respectively, of the electric motor 20, as desired. Since there are but three leads or connections 66, 70, and 7 to this switch 68, it is a simple matter to provide sufficient cable length for extensions to any part of the boat 42 for remote steering thereof.

As the motor 20 rotates, it turns the drum 28 which reels in one end of cable 32 and passes out the other end thereof. The resulting differential tension against the gunwales 44 swings the outboard motor 12 on its steering pivot.

Should the swing of the outboard motor 12 be carried to an extreme by over-controlling motor 20 in one direction, the microswitch actuators 58 or 60 are contacted by the traveling switch actuating block 48 to open the circuit for leads 64 or 72 for that direction.

It is to be emphasized that the steering device of the present invention is not limited to steering of motor boats, but can be utiilzed wherever it is desired to control the direction of movement of a motor from a remote point.

While the present invention has been shown and described in a preferred embodiment, it will be understood that it is not limited to the details shown but is capable of modifications and variations within the spirit of the invention and the scope of the appended claims.

What is claimed is:

1. A remote control unit for a motor rotatably mounted on a mount, comprising, means including a drum having a shaft and rotatably mounted on said motor, a flexible member passed several times around said drum, the ends of said flexible member being secured to substantially opposite sides of said mount, means including a fixed switch mounting member having an elongated shaped groove provided therein, a traveling switch actuating element threadably secured to said drum shaft and having one end engageable in said groove in said member and arranged for movement between the opposite ends of said groove, an electric circuit including a reversible electric motor coupled to said shaft of said drum, a source of power for said reversible electric motor, a pair of microswitches each having an actuator and located at opposite ends of said groove, and remotely operated means electrically associated with said microswitches and reversible electric motor for controlling the direction of rotation of said reversible electric motor, whereby said drum is caused to move in one direction or another to pivot said motor in one direction or another depending upon the direction of rotation of said reversible electric motor.

2. A remote control unit for a motor rotatably mounted on a mount, comprising, means including a grooved drum having a shaft and rotatably mounted on said motor, a cable passed several times around said grooved drum, the ends of said cable being secured to substantially opposite sides of said motor, means including a fixed switch mounting member having an elongated groove provided therein, a traveling switch actuating element threadably secured to said drum shaft and having one end engageable in said groove in said member and arranged for movement between the opposite ends of said groove, an electric circuit including a reversible electric motor coupled to said shaft of said grooved drum, a source of power for said reversible electric motor, a pair of microswitches each having an actuator and located at opposite ends of said groove, one of said microswitches being connected to a forward rotation lead of said reversible electric motor and the other microswitch being connected to a reverse rotation lead thereof, and remotely operated means electrically associated with said microswitches and reversible electric motor for controlling the direction of rotation of said reversible electric motor, whereby said grooved drum is caused to rotate in one direction or another to pivot said motor in one direction or another depending upon the direction of rotation of said reversible electric motor.

3. A remote control steering unit for an outboard motor rotatably mounted at the rear of a boat, comprising, means including a grooved drum having a shaft and rotatably mounted on said outboard motor, a cable passed several times around said grooved drum, the ends of said cable being secured to substantially opposite sides of said boat, means including a fixed switch mounting member having an elongated groove provided therein, a traveling switch actuating element threadably secured to said drum shaft and having one end engageable in said groove in said member and arranged for movement between the opposite ends of said groove, an electric circuit including a reversible electric motor coupled to said shaft of said grooved drum, a source of power for said reversible electric motor, a pair of microswitches each having an actuator and located at opposite ends of said groove, one of said microswitches being connected to a forward rotation lead of said reversible electric motor and the other microswitch being connected to a reverse rotation lead thereof and remotely operated means electrically associated with said microswitches and reversible electric motor for controlling the direction of rotation of said reversible electric motor, whereby said grooved drum is caused to rotate in one direction or another to pivot said outboard motor in one direction or another depending upon the direction of rotation of said reversible electric motor.

4. A remote-controlled steering unit for an outboard motor rotatably mounted at the rear of a boat, comprising, means including a drum having a shaft and rotatably mounted on said outboard motor, a flexible member passed several times around said drum, the ends of said flexible member being secured to substantially opposite sides of said boat, means including a fixed switch mounting member having an elongated shaped groove provided therein, a traveling switch actuating element threadably secured to said drum shaft and having one end engageable in said groove in said member and arranged for movement between the opposite ends of said groove, an electric circuit including a reversible electric motor coupled to said shaft of said drum, a source of power for said reversible electric motor, a pair of microswitches each having an actuator and located at opposite ends of said groove, and remotely operated means electrically associated with said microswitches and reversible electric motor for controlling the direction of rotation of said reversible electric motor, whereby said drum is caused to rotate in one direction or another to pivot said outboard motor in one direction or another depending upon the direction of rotation of said reversible electric motor.

5. A remote-controlled steering unit as recited in claim 4, and tension spring means between each end of said flexible member and its corresponding side of said boat.

6. A remote-controlled steering unit as recited in claim 4, wherein said drum is grooved to receive said flexible member.

References Cited in the file of this patent

UNITED STATES PATENTS 2,755,766     Wanzer                 July 24, 1956